United States Patent [19]

Chang et al.

[11] Patent Number: 6,091,811
[45] Date of Patent: Jul. 18, 2000

[54] RINGING TECHNIQUE IN AUTOMATIC CALL DISTRIBUTION

[75] Inventors: Aileen Y. Chang, New York, N.Y.; Cheryl Lynn Coyle, Howell, N.J.; Lucy Hazel Craddock, Red Bank, N.J.; William Robert Moloney, Spring Lake Heights, N.J.; James Nicolard, Manalapan, N.J.

[73] Assignee: Lucent Technologies Inc., Murray Hill, N.J.

[21] Appl. No.: 08/970,054

[22] Filed: Nov. 13, 1997

[51] Int. Cl.[7] ............................................. H04M 3/00
[52] U.S. Cl. ........................ 379/265; 379/266; 379/267; 379/269; 379/309
[58] Field of Search ............................... 379/247, 252, 379/263, 265, 266, 269, 274, 211, 201, 309

[56] References Cited

U.S. PATENT DOCUMENTS

| | | | |
|---|---|---|---|
| 5,247,569 | 9/1993 | Cave | 379/113 |
| 5,519,773 | 5/1996 | Dumas et al. | 379/265 |
| 5,526,403 | 6/1996 | Tam | 455/426 |
| 5,533,110 | 7/1996 | Pinard et al. | 379/201 |
| 5,537,470 | 7/1996 | Lee | 379/266 |
| 5,592,542 | 1/1997 | Honda et al. | 379/265 |
| 5,692,033 | 11/1997 | Farris | 379/67 |
| 5,844,982 | 12/1998 | Knitl | 379/265 |
| 5,898,767 | 4/1999 | Cave | 379/211 |

*Primary Examiner*—Krista Zele
*Assistant Examiner*—Bing Bui

[57] ABSTRACT

In automated call distribution (ACD) from a telephony server to agent stations, there are concerns with urgency to answer phone calls, not placing callers on hold, and allowing agents to move about to perform other, non-phone tasks. These concerns are met by a ringing technique based on rules which take into account system states which depend on whether agents are busy and whether there are calls waiting, and events such as incoming calls arriving, calls being answered, calls being terminated, and calls being abandoned. The technique is particularly suited for use in retail operations such as fast food delivery, for example.

44 Claims, 2 Drawing Sheets

RINGING TECHNIQUE IN AUTOMATIC CALL DISTRIBUTION

TECHNICAL FIELD

The present invention relates to the automated distribution of telephone calls, from a central telephony server to agent stations.

BACKGROUND OF THE INVENTION

Automatic call distributors (ACD) are used for distributing or dispensing phone calls from a server to a group of agent stations which are connected to the server. For such dispensing, a number of methods have been designed as exemplified in the following.

Most Idle Agent. In the Most Idle Agent (MIA) method, an incoming call is dispensed to that agent which has been available for the longest time. Agents are placed in an agent queue as they first become available or as they complete a call, as well as when they are on a non-ACD call.

Circular Hunting. In Circular Hunting, calls are distributed in a round-robin fashion. For example, if there are agents A, B and C, Agent A gets the first call, Agent B the second, and Agent C the third. The pattern then repeats, starting with agent A getting the fourth call.

Linear Hunting. When a call arrives, Linear Hunting first attempts to send the call to Agent A. If Agent A is busy, the call goes to Agent B, unless Agent B is busy in which case the call goes to Agent C.

Ring All. In the Ring All method, all available stations in a calling group are alerted with the oldest call in the queue of incoming calls. The status of agent stations is monitored so that, as agents become available to answer ACD calls, the oldest call alerts also at their station.

Of special interest in the following are ACD systems for premises where agents do not remain close to an assigned station, but are required to perform other tasks, away from the phone. This applies to fast-food delivery stores, for example.

SUMMARY OF THE INVENTION

We have recognized that, in the interest of meeting demands of (i) urgency to answer phone calls, (ii) not placing callers on hold, and (iii) allowing agents to move about to perform other, non-phone tasks, an ACD system preferably uses a ringing technique based on rules which take into account (a) system states which depend on whether agents are busy and whether there are calls waiting, and (b) events such as incoming calls arriving, calls being answered, calls being terminated, and calls being abandoned.

DETAILED DESCRIPTION OF A PREFERRED EMBODIMENT

The following description, of ACD with a preferred ringing technique, is primarily in process terms. The process steps have been implemented in a prototype system written in C++ to run under Windows NT on a PC. Other types of implementation are not precluded, e.g. as hardware or firmware. Also, while the technique primarily concerns ringing or alerting, it can be combined readily with other, conventional features such as an after-work mode, automated playing of a greeting after a predetermined number of rings, and music on hold, for example.

Figure 1:
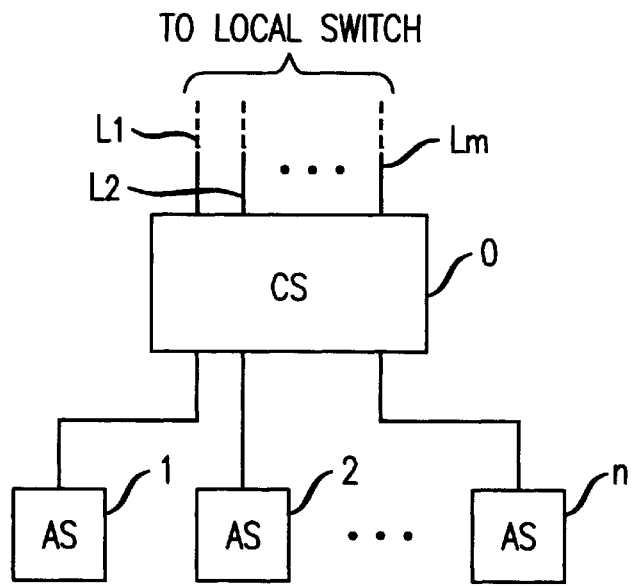
FIG. 1 is a schematic of a private branch exchange (PBX) system with ACD, including a group of agent stations connected to a central server.

FIG. 1 shows a PBX system including a central server (CS) 0 which is connected by lines L1, L2, . . . , Lm to a central office (not shown). Connected to the central server 0 are a number of agent stations (AS) 1, 2, . . . , n which form a calling group.

Figure 2:
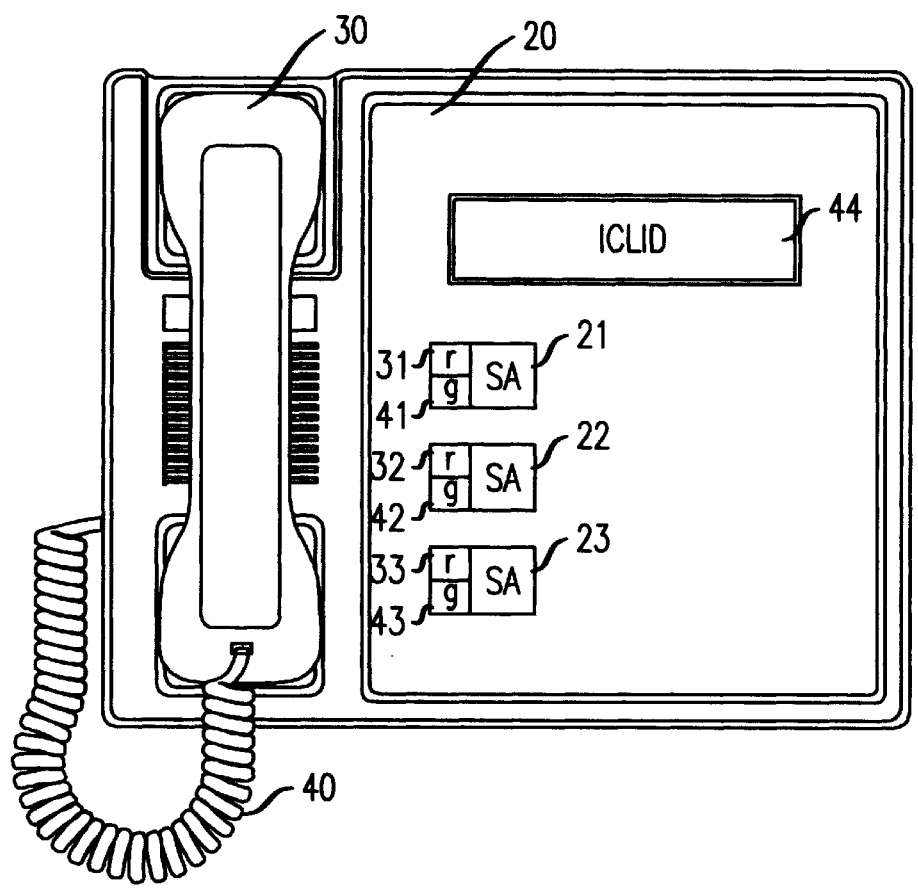
FIG. 2 is a schematic of a portion of the face of an agent station phone.

FIG. 2 shows a portion of a conventional face 20 of an agent station phone with handset 30 and cord 40. The three system access (SA) buttons 21–23 are associated with respective red (r) and green (g) light-emitting diodes (LED) 31–33 and 41–43. Included further is a liquid crystal display (LCD) 44 for incoming call line identification (ICLID).

One convention for the LED displays at an agent station, known as the PARTNER® MLS-18D telephone set, is as follows:

No green, no red—this button is idle.

Green flashing—an incoming call is arriving for the station.

Green winking—the station has put a call on hold at this button.

Green fluttering—the station has put a call on hold pending conference or transfer. This call cannot be picked up by another station.

Green and red alternating—this station is participating in a conference or bridged call at this button.

Steady red—someone else (at least one internal party) is on a call or has put a call on hold pending conference or transfer on the line associated with the button.

Red winking—this call is on hold at someone else's station, and no internal parties associated with this call are active.

Red flashing—this call is alerting at another station.

Each SA button allows a station user any of the following: (i) dial another extension in the system, (ii) dial a pool code to access an outside line, (iii) dial a system speed-dial number, (iv) receive an incoming (internal or external) call, (v) receive a call returning from transfer, and (vi) dial Touch-Tone Administration (TTA).

The following types of calls can be delivered by the central server 0 to an SA button at an agent station: (a) an outside call, (b) a call from another station in the system, and (c) an internal or external call transferred by another station. The present technique relates primarily to the handling of calls arriving at the central server 0 from the central office, in dispensing the calls to agent stations.

All agent stations 1, 2, . . . , n have Ringing Line Preference (RLP). Thus, when a station goes off-hook at a ringing phone, it will be connected to the alerting call. If more than one call is ringing, the connection is to the call which has been ringing the longest. RLP is used instead of Idle Line Preference (ILP), when there is a ringing call, because RLP has higher priority than ILP, so that an alerting call will always be answered when a phone goes off hook. A phone's user can override RLP by pressing the button associated with a different, idle or alerting SA. This automatically takes the station off-hook at that facility.

The technique uses the Ring All method. With this method, there is no need for agents to log on, as the system distributes all incoming calls to all idle stations. The basic scenario for receiving a call includes the following sequence of events:

1. The phone rings.
2. The LED associated with an SA flashes green.
3. The user of the phone lifts the handset.
4. The phone goes off-hook.
5. The LED turns to steady green.
6. The user is connected to the call.

The following are among specific features of the technique:

Only idle stations are alerted of an incoming call. If there are multiple calls, only the oldest call is offered to the idle phones.

Ringing is limited to a preset duration if at least one agent phone is busy, e.g., to a duration which results in 3 rings. Otherwise, all idle phones keep ringing indefinitely. Reminder ringing is provided on all idle sets when there is a call in the waiting queue and the preset duration interval has ended.

Only one ACD call is delivered at a time to the stations, so as not to tempt an agent to put a current call on hold in order to answer another alerting ACD call. While there are calls in the queue, all idle agents have a visual indication of a call, along with the ICLID information associated with the oldest call in the queue. When an agent goes off-hook to answer this call, the agent will be connected to the oldest call in the queue, and the corresponding ICLID information continues to be displayed until the agent hangs up. At sets alerting with an ACD call, if there are still calls in the queue when an agent answers a call at another station, there is no change in the visual alert, but the ICLID information changes to reflect the current oldest call in the queue.

As agents free up and become available for calls, they begin to be alerted with the oldest call in the queue, as described above. In order to move on to the next call, an agent can hang up on the current call, in which case the station begins to alert with the next call. The agent can answer this call by going off-hook.

In addition to the regular ringing at agent stations, a reminder ring serves to remind agents of calls, based on the queue.

Since, with Ring All, there is no log-on of agents, the status of agent extensions is used as to whether they are idle or busy, in determining how incoming calls are presented to agent stations. The idle state can be defined in one of a number of different ways, including: (a) "connected to another ACD call", (b) "connected outgoing to an outside line", or (c) either (a) or (b).

Only one ACD call can appear at an agent's station at a time. All agents that are alerting for an ACD call are alerted for the same call, namely the oldest call in the system. For the call, the display shows the ICLID. If the oldest call is either answered or abandoned, the next-oldest call and its ICLID are presented at all available agent sets.

At agent stations that are not active on a call, one of the following ringing modes appertains:

Ringing Mode 1—not ringing,
Ringing Mode 2—ringing for the first call, indefinitely,
Ringing Mode 3—reminder ringing.

Figure 3:
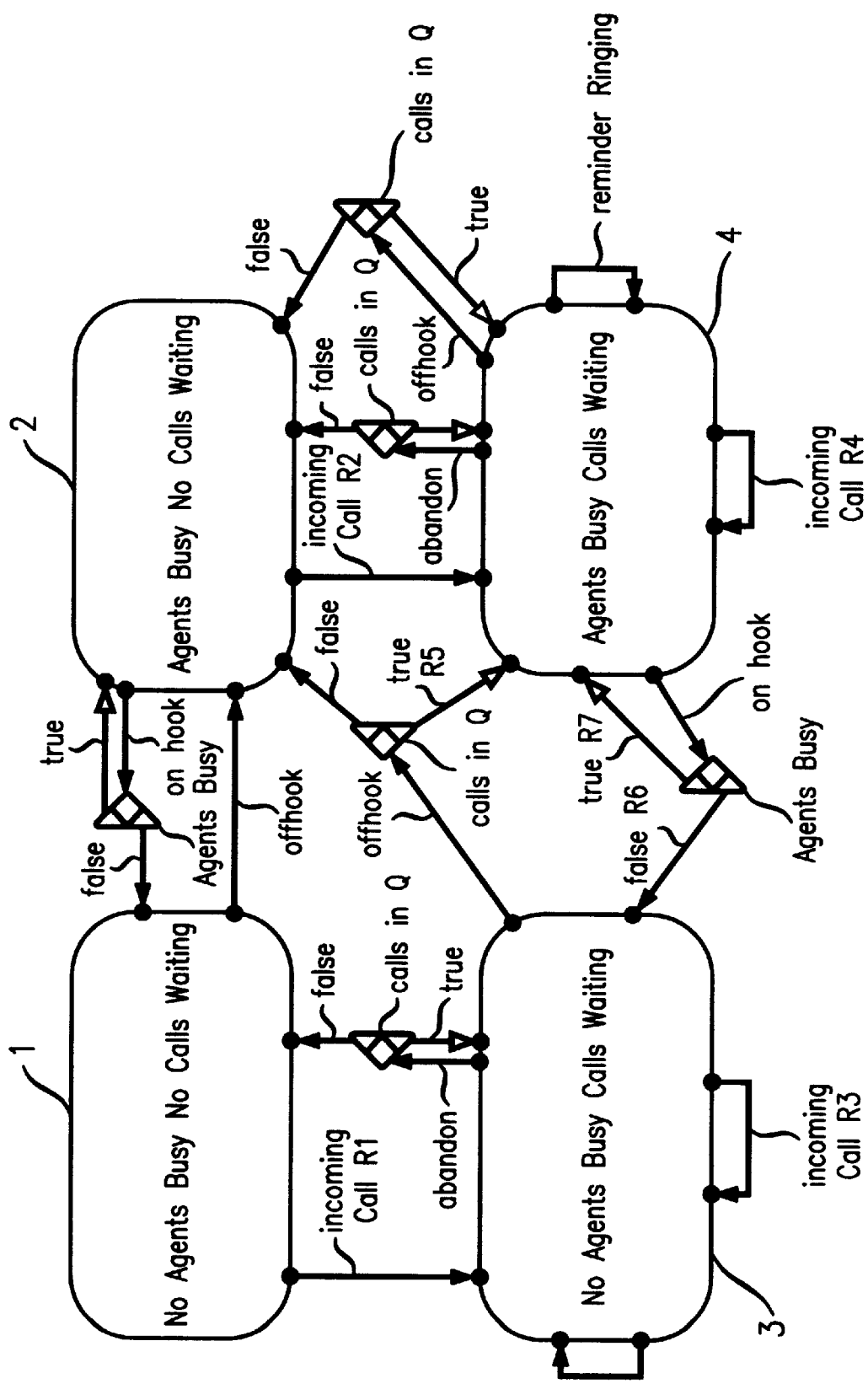
FIG. 3 is a functionality or state diagram for an ACD system of the present invention. For captions see Tables 1 and 2.

With reference to FIG. 3 and Tables 1 and 2, the technique can be described as a state machine. The states of the system depend on whether there is any busy agent and whether there is at least one queued call, waiting to be answered by an agent. The four respective states, 1–4, are listed in Table 1 and illustrated in FIG. 3 with corresponding reference numerals. Table 2 includes a list of rules, R1 through R8, which govern the transitions between the states.

Arrows in FIG. 3 represent transitions between states, and the event which triggers a transition is described next to the arrow. Where a transition depends on an additional condition, a corresponding test is represented by a triangle bearing a caption for the condition. The arrow pointing to the right-angle vertex of the triangle corresponds to the event which triggers the transition. The two arrows originating at the 45-degree vertices complete the transition, depending on whether or not the captioned condition is met, respectively. FIG. 3 also includes rule designations, placed where a designated rule is applied.

The stimuli to the state machine include: (i) incoming call, (ii) far-end abandon (i.e. before the caller is connected with a human agent), (iii) agent on-hook transition, and (iv) agent off-hook transition.

In Table 1, each cell shows either an "X" for "no transition", or information describing a transition. For the latter, "Ss" with s=1, 2, 3 or 4 denotes the new state to be entered when the event or "stimulus" for the respective column occurs. "Rr" with r=1, 2, 3, 4, 5, 6, 7 or 8 denotes the rule that is followed when the state machine transitions from its current state to state Ss. In Table 1, iconic symbols refer to respective comments which are included below the table.

Some typical sequential scenarios are illustrated by Tables 3.1 through 3.9, assuming that there are three lines assigned for ACD and three agents. Blank cells indicate that the line or agent is idle. Cells identified as "Alert" indicate that a call has come in on that line. Cells that are identified as "Ring" indicate indefinite ringing. All ringing states, i.e. indefinite ringing, "ring 3 times", and reminder ringing are accompanied by visual alerting and the associated ICLID.

In FIG. 3.8, with respect to the entries for State 4, Agent 2 and Agent 3, a raised "a" indicates that no new ringing is introduced. If these agents had been receiving 3 ring cycles or reminder ring, the same will continue.

TABLE 1

STATE MACHINE

| State | Meaning | Incoming ACD Call | Far End ABANDON | ON-HOOK | OFF-HOOK on AN ACD CALL |
|---|---|---|---|---|---|
| 1 | No Agents Busy No ACD Calls Waiting | S3 + R1 | X | X | X |
| 2 | Agents Busy No ACD Calls Waiting | S4 + R2 | X | S1♣ or S2♦ | X |
| 3 | No Agents Busy ACD Calls Waiting | S3 + R3 | S1♥ + R8 or S3♠ | X | S2♥ + R8 or S4♠ + R5 |

TABLE 1-continued

STATE MACHINE

| State | Meaning | Incoming ACD Call | Far End ABANDON | ON-HOOK | OFF-HOOK on AN ACD CALL |
|---|---|---|---|---|---|
| 4 | Agents Busy ACD Calls Waiting | S4 + R4 | S2♥ + R8 or S4♠ | S3♣ + R6 or S4♦ + R7 | S2♥ + R8 or S4♠ |

♣Go to this state if there are no more agents busy
♦Go to this state if there is at least one agent busy
♥Go this state if there are no more calls waiting to be answered
♠Go to this state if there are more calls waiting to be answered

TABLE 2

RULES

| RULE | USE | SETTINGS |
|---|---|---|
| R1 | Treatment for first incoming call when all agents are idle | Ring all idle agents forever |
| R2 | Treatment for first incoming call when at least one agent is busy | Ring all idle agents three times |
| R3 | Treatment for subsequent (not first) calls when all agents are idle | Ring all idle agents forever |
| R4 | Treatment for subsequent (not first) calls when at least one agent is busy | Don't introduce any new ringing (Ringing is provided by reminder ring) |
| R5 | Treatment for idle agents when there are calls waiting to be answered and an agent goes off-hook | Ring all idle agents three times |
| R6 | Treatment for idle agents when there are calls waiting to be answered and the only busy agent goes on-hook | Ring all idle agents forever |
| R7 | Treatment for idle agents when there are calls waiting to be answered and an agent goes on-hook (other agents still busy) | Don't introduce any new ringing. (Continue any existing ring pattern) |
| R8 | Ringing treatment when the number of calls waiting goes from 1 to 0 | Stop ringing |

TABLE 3.1

Idle System

| STATE | LINE 1 | LINE 2 | LINE 3 | AGENT 1 | AGENT 2 | AGENT 3 |
|---|---|---|---|---|---|---|
| 1 | | | | | | |

TABLE 3.2

Incoming Call (No calls waiting to be answered, all agents idle)

| STATE | LINE 1 | LINE 2 | LINE 3 | AGENT 1 | AGENT 2 | AGENT 3 |
|---|---|---|---|---|---|---|
| 3 | Alert | | | Ring | Ring | Ring |

TABLE 3.3

Agent 1 answers alert.

| STATE | LINE 1 | LINE 2 | LINE 3 | AGENT 1 | AGENT 2 | AGENT 3 |
|---|---|---|---|---|---|---|
| 3 | Alert | | | Ring | Ring | Ring |
| 2 | Busy-Agent 1 | | | Busy-Line 1 | | |

TABLE 3.4

Agent 1 goes on-hook.

| STATE | LINE 1 | LINE 2 | LINE 3 | AGENT 1 | AGENT 2 | AGENT 3 |
|---|---|---|---|---|---|---|
| 3 | Alert | | | Ring | Ring | Ring |
| 2 | Busy-Agent 1 | | | Busy-Line 1 | | |
| 1 | | | | | | |

TABLE 3.5

A second call arrives.

| STATE | LINE 1 | LINE 2 | LINE 3 | AGENT 1 | AGENT 2 | AGENT 3 |
|---|---|---|---|---|---|---|
| 3 | Alert | | | Ring | Ring | Ring |
| 3 | Alert | Alert | | Ring | Ring | Ring |

TABLE 3.6

Agent 1 answers the oldest call.

| STATE | LINE 1 | LINE 2 | LINE 3 | AGENT 1 | AGENT 2 | AGENT 3 |
|---|---|---|---|---|---|---|
| 3 | Alert | | | Ring | Ring | Ring |
| 3 | Alert | Alert | | Ring | Ring | Ring |
| 4 | Busy-Agent 1 | Alert | | Busy-Line 1 | Ring 3 Times | Ring 3 Times |

TABLE 3.6-continued

Agent 1 answers the oldest call.

| STATE | LINE 1 | LINE 2 | LINE 3 | AGENT 1 | AGENT 2 | AGENT 3 |
|---|---|---|---|---|---|---|
| | Busy-Agent 1 | Alert | | Busy-Line 1 | Reminder Ring | Reminder Ring |

TABLE 3.7

Agent 1 goes on-hook.

| STATE | LINE 1 | LINE 2 | LINE 3 | AGENT 1 | AGENT 2 | AGENT 3 |
|---|---|---|---|---|---|---|
| 3 | Alert | | | Ring | Ring | Ring |
| 3 | Alert | Alert | | Ring | Ring | Ring |
| 4 | Busy-Agent 1 | Alert | | Busy-Line 1 | Ring 3 Times | Ring 3 Times |
| 4 | Busy-Agent 1 | Alert | | Busy-Line 1 | Reminder Ring | Reminder Ring |
| | | | | Agent 1 goes on hook | | |
| 3 | | Alert | | | Ring | Ring |

TABLE 3.8

A third call arrives

| STATE | LINE 1 | LINE 2 | LINE 3 | AGENT 1 | AGENT 2 | AGENT 3 |
|---|---|---|---|---|---|---|
| 3 | Alert | | | Ring | Ring | Ring |
| 3 | Alert | Alert | | Ring | Ring | Ring |
| 4 | Busy-Agent 1 | Alert | | Busy-Line 1 | Ring 3 Times Reminder Ring | Ring 3 Times Reminder Ring |
| 4 | Busy-Agent 1 | Alert | Alert | Busy-Line 1 | Reminder Ring$^a$ | Reminder Ring$^a$ |

TABLE 3.9

Agent 2 answers the second call.

| STATE | LINE 1 | LINE 2 | LINE 3 | AGENT 1 | AGENT 2 | AGENT 3 |
|---|---|---|---|---|---|---|
| 3 | Alert | | | Ring | Ring | Ring |
| 3 | Alert | Alert | | Ring | Ring | Ring |
| 4 | Busy-Agent 1 | Alert | | Busy-Line 1 | Ring 3 Times Reminder Ring | Ring 3 Times Reminder Ring |
| 4 | Busy-Agent 1 | Busy-Agent 2 | Alert | Busy-Line 1 | Busy-Line 2 | Ring 3 Times |

We claim:

1. A method for distributing telephone calls in a telephony server to a group of telephone agent stations which are connected to the server, with the server having a plurality of systems states including a current systems state, the method comprising:
   (a) determining occurrence of an event selected from (i) a call arriving at the server, (ii) an agent station going off-hook, (iii) far-end abandonment of a call, and (iv) completion of a call;
   (b) determining, based on the occurrence of the event, whether to change the current systems state to another one of the systems states and, if so determined, so changing the systems state; and
   (c) ringing at agent stations based on the current systems state with ringing comprising a reminder ring at all idle stations when there is a call waiting past a preset time interval.

2. The method according to claim 1, wherein the plurality of systems states comprises states which depend on how many of the agent stations are busy and how many calls are waiting.

3. The method according to claim 2, wherein the plurality of systems states comprises states of (I) "no agent station busy and no call waiting", (II) "at least one agent station busy and no call waiting", (III) "no agent station busy and call waiting", and (IV) "at least one agent station busy and call waiting".

4. The method according to claim 2, comprising considering, in determining whether an agent station is busy, only calls which are subject to the distributing.

5. The method according to claim 2, comprising considering, in determining whether an agent station is busy, only calls going out from the server.

6. The method according to claim 2, comprising considering all calls in determining whether an agent station is busy.

7. The method according to claim 3, wherein, on an incoming call, all idle agent stations ring indefinitely when none of the agent stations is busy and no call is waiting (Rule 1).

8. The method according to claim 3, wherein, on an incoming call, all idle agent stations ring for a preset duration when at least one of the agent stations is busy and no call is waiting (Rule 2).

9. The method according to claim 3, wherein, on any incoming call after the first incoming call, all idle agent stations ring indefinitely when all agent stations are idle (Rule 3).

10. The method according to claim 3, wherein, on an incoming call, there is no additional ringing when at least one agent station is busy and at least one call is waiting (Rule 4).

11. The method according to claim 3, wherein, on an agent station going off-hook, all idle agent stations ring for a preset duration when at least one call is waiting (Rule 5).

12. The method according to claim 3, wherein, on an agent station going on-hook which was the only busy agent station, all idle agent stations ring indefinitely when at least one call is waiting (Rule 6).

13. The method according to claim 3, wherein, on an agent station going on-hook while other agent stations remain busy, no new ringing is activated (Rule 7).

14. The method according to claim 3, wherein, on a count of calls waiting going from 1 to 0, ringing stops (Rule 8).

15. A system for distributing telephone calls in a telephony server, to a group of telephone agent stations which are connected to the server, with the server having a plurality of systems states including a current systems state, the system comprising:
   (a) means for determining occurrence of an event selected from (i) a call arriving at the server, (ii) an agent station going off-hook, (iii) far-end abandonment of a call, and (iv) completion of a call;
   (b) means for determining, based on the occurrence of the event, whether to change the current systems state to another one of the systems states and, if so determined, so changing the systems state; and
   (c) means for ringing at agent stations based on the current systems state with ringing comprising a reminder ring at all idle stations when there is a call waiting past a preset time interval.

16. The system according to claim 15, wherein the plurality of systems states comprises states which depend on how many of the agent stations are busy and how many calls are waiting.

17. The system according to claim 16, wherein the plurality of systems states comprises states of (I) "no agent station busy and no call waiting", (II) "at least one agent station busy and no call waiting", (III) "no agent station busy and call waiting", and (IV) "at least one agent station busy and call waiting".

18. The system according to claim 16, comprising means for considering, in determining whether an agent station is busy, only calls which are subject to the distributing.

19. The system according to claim 16, comprising means for considering, in determining whether an agent station is busy, only calls going out from the server.

20. The system according to claim 16, comprising means for considering all calls in determining whether an agent station is busy.

21. The system according to claim 17, wherein, on an incoming call, all idle agent stations ring indefinitely when none of the agent stations is busy and no call is waiting in the (Rule 1).

22. The system according to claim 17, wherein, on an incoming call, all idle agent stations ring for a preset duration when at least one of the agent stations is busy and no call is waiting (Rule 2).

23. The system according to claim 17, wherein, on any incoming call after the first incoming call, all idle agent stations ring indefinitely when all agent stations are idle (Rule 3).

24. The system according to claim 17, wherein, on an incoming call, there is no additional ringing when at least one agent station is busy and at least one call is waiting (Rule 4).

25. The system according to claim 17, wherein, on an agent station going off-hook, all idle agent stations ring for a preset duration when at least one call is waiting in the (Rule 5).

26. The system according to claim 17, wherein, on an agent station going on-hook which was the only busy agent station, all idle agent stations ring indefinitely when at least one call is waiting in the (Rule 6).

27. The system according to claim 17, wherein, on an agent station going on-hook while other agent stations remain busy, no new ringing is activated (Rule 7).

28. The system according to claim 17, wherein, on a count of calls waiting going from 1 to 0, ringing stops (Rule 8).

29. A system for distributing telephone calls in a telephony server, to a group of telephone agent stations which are connected to the server, with the server having a plurality of systems states including a current systems state, the system comprising a processor which is instructed for:
(a) determining occurrence of an event selected from (i) a call arriving at the server, (ii) an agent station going off-hook, (iii) far-end abandonment of a call, and (iv) completion of a call;
(b) determining, based on the occurrence of the event, whether to change the current systems state to another one of the systems states and, if so determined, so changing the systems state; and
(c) ringing at agent stations based on the current systems state with ringing comprising a reminder ring at all idle stations when there is a call waiting past a preset time interval.

30. The system according to claim 29, wherein the plurality of systems states comprises states which depend on how many of the agent stations are busy and how many calls are waiting.

31. The system according to claim 30, wherein the plurality of systems states comprises states of (I) "no agent station busy and no call waiting", (II) "at least one agent station busy and no call waiting", (III) "no agent station busy and call waiting", and (IV) "at least one agent station busy and call waiting".

32. The system according to claim 30, wherein the processor is instructed for considering, in determining whether an agent station is busy, only calls which are subject to the distributing.

33. The system according to claim 30, wherein the processor is instructed for considering, in determining whether an agent station is busy, only calls going out from the server.

34. The system according to claim 30, wherein the processor is instructed for considering all calls in determining whether an agent station is busy.

35. The system according to claim 31, wherein, on an incoming call, all idle agent stations ring indefinitely when none of the agent stations is busy and no call is waiting (Rule 1).

36. The system according to claim 31, wherein, on an incoming call, all idle agent stations ring for a preset duration when at least one of the agent stations is busy and no call is waiting in the (Rule 2).

37. The system according to claim 31, wherein, on any incoming call after the first incoming call, all idle agent stations ring indefinitely when all agent stations are idle (Rule 3).

38. The system according to claim 31, wherein, on an incoming call, there is no additional ringing when at least one agent station is busy and at least one call is waiting (Rule 4).

39. The system according to claim 31, wherein, on an agent station going off-hook, all idle agent stations ring for a preset duration when at least one call is waiting (Rule 5).

40. The system according to claim 31, wherein, on an agent station going on-hook which was the only busy agent station, all idle agent stations ring indefinitely when at least one call is waiting (Rule 6).

41. The system according to claim 31, wherein, on an agent station going on-hook while other agent stations remain busy, no new ringing is activated (Rule 7).

42. The system according to claim 31, wherein, on a count of calls waiting going from 1 to 0, ringing stops (Rule 8).

43. A system for distributing telephone calls in a telephony server, to a group of telephone agent stations which are connected to the server, with the server having a plurality of systems states including a current systems state, the system comprising:
(a) a sensor module which is sensitive to occurrence of an event selected from (i) a call arriving at the server, (ii) an agent station going off-hook, (iii) far-end abandonment of a call, and (iv) completion of a call;
(b) a determiner module which is operationally coupled to the sensor module and which, upon occurrence of the event, determines whether to change the current systems state to another one of the systems states and, if so determined, so changes the systems state; and
(c) a ringer module which is sensitive to the systems state so that ringing at agent stations is a function of the systems state, with ringing comprising a reminder ring at all idle stations when there is a call waiting past a preset time interval.

44. A system for distributing telephone calls in a telephony server, to a group of telephone agent stations which are connected to the server, with the server having a plurality of systems states comprising states of (I) "no agent station busy and no call waiting, (II) "at least one agent station busy and no call waiting", (III) "no agent station busy and call waiting", and (IV) "at least one agent station busy and call waiting" and with one of the states being a current systems state, the system comprising:

(a) a sensor module which is sensitive to occurrence of an event selected from (i) a call arriving at the server, (ii) an agent station going off-hook, (iii) far-end abandonment of a call, and (iv) completion of a call;

(b) a determiner module which is operationally coupled to the sensor module and which, upon occurrence of the event, determines whether to change the current systems state to another one of the systems states and, if so determined, so changes the systems state; and (c) a ringer module which is sensitive to the systems state so that ringing at agent stations is a function of the systems state;

wherein:

on an incoming call, all idle agent stations ring indefinitely when none of the agent stations is busy and no call is waiting (Rule 1);

on an incoming call, all idle agent stations ring for a preset duration when at least one of the agent stations is busy and no call is waiting in the (Rule 2);

on any incoming call after the first incoming call, all idle agent stations ring indefinitely when all agent stations are idle (Rule 3);

on an incoming call, there is no additional ringing when at least one agent station is busy and at least one call is waiting (Rule 4), with ringing comprising a reminder ring at all idle stations when there is a call waiting past a preset time interval;

on an agent station going off-hook, all idle agent stations ring for a preset duration when at least one call is waiting (Rule 5);

on an agent station going on-hook which was the only busy agent station, all idle agent stations ring indefinitely when at least one call is waiting (Rule 6);

on an agent station going on-hook while other agent stations remain busy, no new ringing is activated (Rule 7);

on a count of calls waiting going from 1 to 0, ringing stops (Rule 8).

\* \* \* \* \*